United States Patent
Shilton et al.

(10) Patent No.: US 11,017,911 B2
(45) Date of Patent: May 25, 2021

(54) LOW DENSITY POROUS IRIDIUM

(71) Applicant: QSA GLOBAL INC., Burlington, MA (US)

(72) Inventors: Mark G. Shilton, Chelmsford, MA (US); Mark W. Vose, Windham, NH (US)

(73) Assignee: QSA GLOBAL, INC., Burlington, MA (US)

( * ) Notice: Subject to any disclaimer, the term of this patent is extended or adjusted under 35 U.S.C. 154(b) by 0 days.

(21) Appl. No.: 16/303,872

(22) PCT Filed: Sep. 7, 2017

(86) PCT No.: PCT/US2017/050425
§ 371 (c)(1),
(2) Date: Nov. 21, 2018

(87) PCT Pub. No.: WO2018/084929
PCT Pub. Date: May 11, 2018

(65) Prior Publication Data
US 2020/0328005 A1 Oct. 15, 2020

Related U.S. Application Data

(63) Continuation-in-part of application No. PCT/US2017/033508, filed on May 19, 2017, which
(Continued)

(51) Int. Cl.
*G21G 4/06* (2006.01)
*C22C 27/00* (2006.01)
*C01G 55/00* (2006.01)

(52) U.S. Cl.
CPC ............... *G21G 4/06* (2013.01); *C01G 55/00* (2013.01); *C22C 27/00* (2013.01)

(58) Field of Classification Search
CPC ........... G21G 4/06; C01G 55/00; C22C 27/00
(Continued)

(56) References Cited

U.S. PATENT DOCUMENTS 2,394,727 A   2/1946   Taylor
7,118,729 B1  10/2006  O'Foghludha
(Continued)

FOREIGN PATENT DOCUMENTS

DE   19824689    10/1999
RU   2152096 C1   6/2000
(Continued)

OTHER PUBLICATIONS

International Search Report issued in PCT/US2017/050425 dated Nov. 6, 2017.
(Continued)

*Primary Examiner* — Michael Maskell
(74) *Attorney, Agent, or Firm* — McCarter & English, LLP

(57) ABSTRACT

The disclosure pertains to a radiation source, such as an active insert, typically containing porous or microporous iridium or compounds, alloys or composites thereof within an encapsulation, and methods of manufacture thereof. The porosity or microporosity or low-density alloying ingredient with iridium causes a reduced density of the iridium within the active insert to be achieved.

13 Claims, 9 Drawing Sheets

Related U.S. Application Data is a continuation-in-part of application No. 16/302,221, filed as application No. PCT/US2017/033508 on May 19, 2017, now Pat. No. 10,607,743.

(60) Provisional application No. 62/340,777, filed on May 24, 2016, provisional application No. 62/378,881, filed on Aug. 24, 2016.

(58) Field of Classification Search
USPC .................................................. 250/493.1
See application file for complete search history.

(56) References Cited

U.S. PATENT DOCUMENTS

| 2003/0149329 | A1 | 8/2003 | O'Foghludha | |
|---|---|---|---|---|
| 2015/0102238 | A1 | 4/2015 | Finger et al. | |
| 2017/0084357 | A1* | 3/2017 | Shilton | G21G 4/06 |

FOREIGN PATENT DOCUMENTS

| RU | 95166 U1 | 6/2010 | | |
|---|---|---|---|---|
| WO | 2004109716 | 12/2004 | | |
| WO | 2015105539 | 7/2015 | | |
| WO | 2015/175326 | 11/2015 | | |
| WO | WO-2015175326 A1 * | 11/2015 | | G21G 4/06 |
| WO | 2019/246073 | 12/2019 | | |

OTHER PUBLICATIONS

International Search Report issued in PCT/US2020/017601 dated Jul. 17, 2020.

V. Raghavan, "Al—B—Ir (Aluminum-Boron-Iridum)", Journal of Phase Equilibria and Diffusion, vol. 29, No. 1, 2008, p. 42.

V. Raghavan, "Al—Ir—V (Aluminum-Iridium-Vanadium)", Journal of Phase Equilibria and Diffusion, vol. 29, No. 4, 2008, p. 372.

H. Ipser and P. Rogl, "Constitution Diagrams of the Binary Systems Pd—B and Ir—B", Elsevier Sequoia/Printed in The Netherlands, Metall. Trans. A., 1981, p. 363.

G. B. Ulrich, "The Metallurgical Integrity of the Frit Vent Assembly Diffusion Bond", Process Metallurgy Department Development Organization, Jun. 1994, pp. 1-22.

HIMIKATUS.RU, http://www.himikatus.ru/art/phase-diagr1/Al-Ir.php, pp. 1-5.

Notification Concerning Transmittal of International Preliminary Report on Patentability issued in Application No. PCT/US2017/033508 dated Dec. 6, 2018.

Notification Concerning Transmittal of International Preliminary Report on Patentability issued in Application No. PCT/US20171033508 dated Dec. 6, 2018.

International Search Report issued in PCT/US2019/037697 dated Sep. 26, 2019.

hittp://www.orau.org/ptp/collection/sources/3mdisk.htm (May 10, 2011).

hittp://www.nrc.gov/docs/ML0415/ML041550720 (Jun. 3, 2004).

* cited by examiner

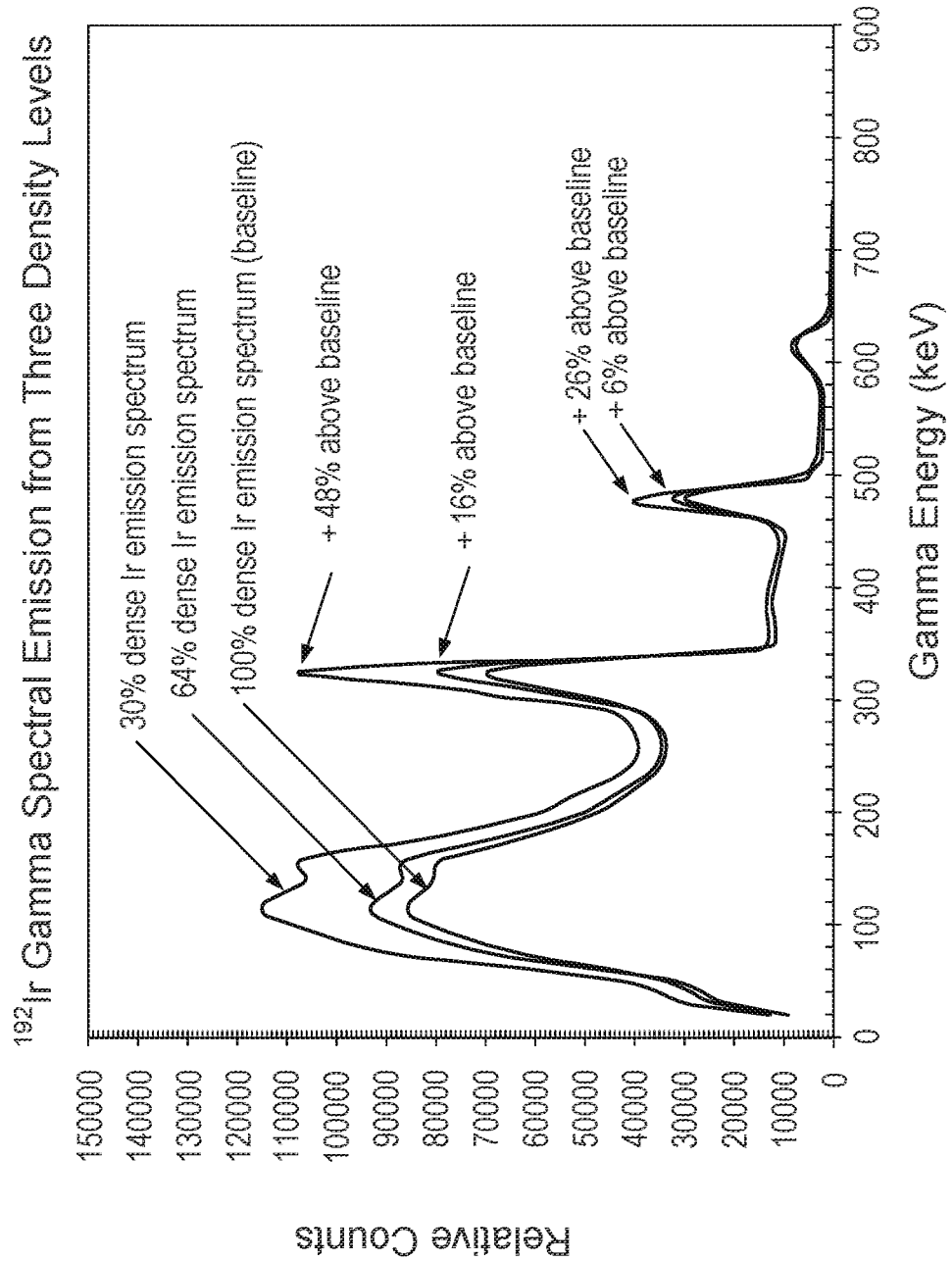
F I G. 2

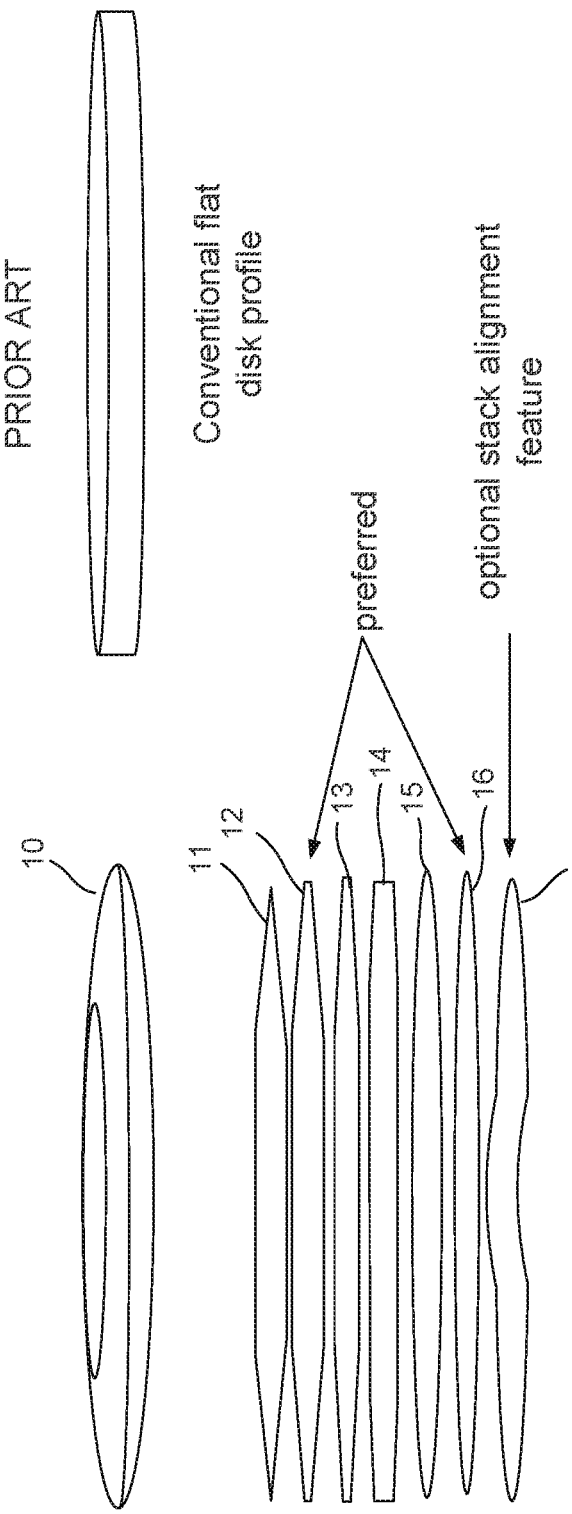

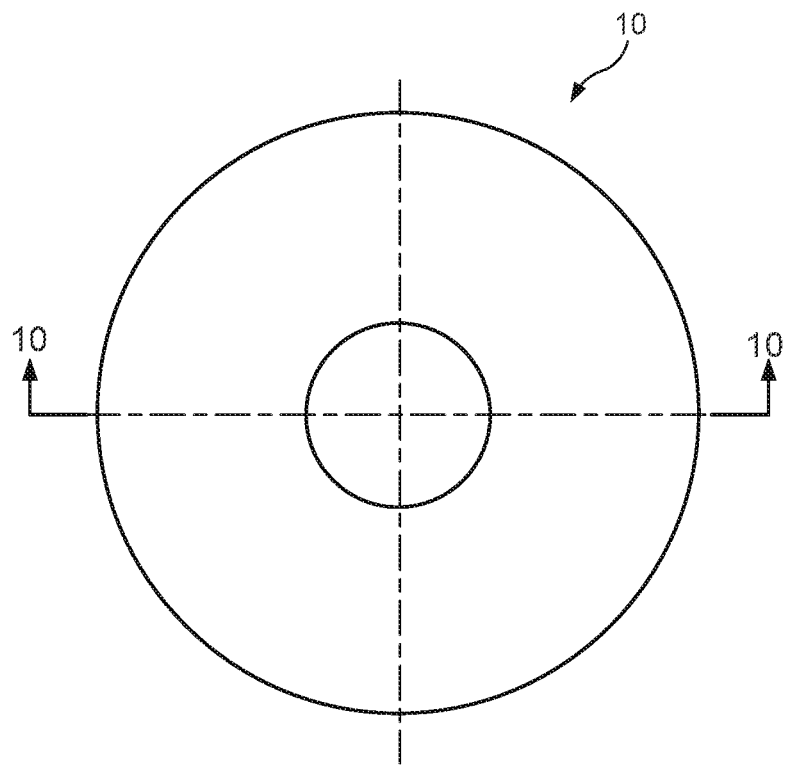
F I G. 9
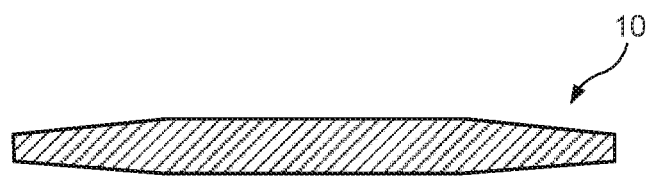
F I G. 10

LOW DENSITY POROUS IRIDIUM

This application is a National Phase application of PCT/US2017/050425 filed on Sep. 7, 2017, which is a continuation-in-part of PCT/US2017/033508 filed on May 19, 2017, both of which claim priority under 35 U.S.C. § 119(e) of U.S. provisional application Ser. No. 62/378,881 filed on Aug. 24, 2016 and 62/340,777 filed on May 24, 2016, the contents of which are hereby incorporated by reference in their entirety and for all purposes. This application is further a continuation-in-part of U.S. application Ser. No. 16/302,221 filed on Nov. 16, 2018 which is a National Phase application of PCT/US2017/033508.

BACKGROUND OF THE DISCLOSURE

Field of the Disclosure

The disclosure pertains to a gamma radiation source, typically containing microbeads of iridium, or low-density alloys or compounds or composites of iridium and porous variants of these, within an encapsulation, and methods of manufacture thereof.

Description of the Prior Art

The prior art of radiation sources of various types for medical, industrial and other processes is well-developed. However, further improvements are sought, particularly with respect to manufacturing economies and product performance.

A prior art method for producing a gamma ray source is disclosed in PCT/NL2004/000401 (also published as WO 2004109716 A2) to Bakker Klass. This method includes the steps of neutron irradiation of disks of iridium or cobalt, and stacking the disks to form a cylinder. Similarly, the prior art includes PCT/US2015/029806 (also published as WO 2015175326 A1) entitled "Device and Method for Enhanced Iridium Gamma Radiation Sources"; German Patent Document DE 19824689 C1 with a translated title "Iridium-Containing Molding useful as a Gamma Radiation Source e.g., For Weld Seam Radiography and Cancer Treatment"; and PCT/US2015/029806 entitled "Device and Method for Enhanced Iridium Gamma Radiation Sources."

Further prior art relating to the manufacture of metallic spheres includes U.S. Pat. No. 2,394,727 entitled "Method for Making Small Metallic Spheres", issued on Feb. 12, 1946 to Taylor, and information found at:
http://www.orau.org/ptp/collection/sources/3mdisk.htm; and
http://www.nrc.gov/docs/ML0415/ML041550720.pdf.

Methods of manufacturing porous iridium can be found in "The Metallurgical Integrity of the Frit Vent Assembly Diffusion Bond," by G. B. Ulrich, June 1994, Document Y/DV-1321, Oak Ridge Y-12 Plant, Martin Marietta Energy Systems, Inc.

OBJECTS AND SUMMARY OF THE DISCLOSURE

It is therefore an object of the present disclosure to provide improvements in the radioactive sources used in medical and industrial applications. Embodiments of the disclosure may achieve many of the following objectives with respect to the prior art—reduced fabrication costs, reduced focal dimensions (particularly with respect to cylindrical geometry natural iridium disk sources), increased activation yield, increased output (more output Ci/mg due to reduced density), a softer emission spectrum due to low reduced density (i.e., more predominant lower energy emissions) and a near spherical, or quasi-spherical geometry (resulting in improved image quality), but typically including flat sides around its circumference in order to avoid infinitely sharp tangential lid components. Additionally, handling of radioactive powders can be reduced or eliminated in embodiments of this disclosure.

It is envisioned that embodiments of the present disclosure could increase Iridium-192 output efficiency, perhaps in the range of 11-17 percent, particularly if sources could be made using 50 to 65 percent dense iridium with spherical or quasi-spherical geometry. This could further result in a reduction of 11 to 17 percent in Iridium-192 source content and annual consumption. Additionally, the softer output spectrum combined with near-spherical focal geometry could result in image quality approaching that of cylindrical enriched Iridium-192 sources. It is further envisioned that this could potentially lead to an increased activation yield of 7-11 percent leading to an overall 18-28 percent efficiency gain.

Optionally, flat-faced disks of low-density porous iridium or a compound, alloy, composite or porous variant thereof can be activated to produce disks containing Ir-192. After activation, disks can be stacked to form a cylinder and in this form be used to make conventional cylindrical focal geometry sources or they can be compressed, compacted or deformed after activation to produce more spherical or quasi-spherical focal geometries.

Disks of low-density porous iridium or a compound, alloy, composite or porous variant thereof having curved, domed or otherwise shaped faces can be made so that they are thicker in the middle than at the circumference. Some practical examples are shown in FIG. 4. These can be activated to produce disks containing Ir-192. After activation, such disks can be stacked and then compressed, compacted or deformed to produce spherical or quasi-spherical focal geometries. Disks that are shaped in this way may be more easily converted into spherical or quasi-spherical focal geometry by compression, compaction or deformation as shown in FIG. 5, leading to manufacturing advantages.

The use of spherical or quasi-spherical low-density Iridium-192 or a compound, alloy, composite or porous variant thereof could achieve similar yield and output efficiency gains that have been achieved with annular iridium, but without image quality or focal dimension disadvantages of annuli stacked in a cylindrical configuration.

Alternately spherical or quasi-spherical low density Iridium-192 or a compound, alloy, composite or porous variant thereof could also be made using random-packed or partially random packed microgranules in a spherical or quasi-spherical source cavity. Porous microgranules may be compressed, compacted or deformed to produce spherical or quasi-spherical focal geometries.

It should be noted that the pore size within porous iridium or a compound, alloy, composite or porous variant thereof may vary and be in the range from sub-micrometer dimensions (sometimes referred to as microporosity) to approximately sub-millimeter dimensions (sometimes referred to as porosity).

Porous iridium or a compound, alloy, composite or porous variant thereof may be made by several different methods. One method is to heat microspheres or micro-granules at a temperature, typically above 1000° C., but more typically above 1300° C. for a time period long enough to initiate durable bonding and fusion at their points of contact.

Microporous iridium or a compound, alloy, composite or porous variant thereof may also be made by partially sintering finely divided powder at a temperature, typically above 1000° C., but more typically above 1300° C. for a time period long enough to initiate durable interparticle bonding and fusion at their points of contact, but not long enough to complete the densification process. Such a microporous product will have a density less than one hundred percent of the theoretical density of iridium, due to the voids, pockets or channels formed within the iridium or iridium alloy, compound or composite.

Isotopically enriched iridium-191 powder can be used as a raw material for making low density porous iridium or a compound, alloy, composite or porous variant thereof. This form of iridium can be made by gas-centrifuge isotopic enrichment of gaseous natural isotopic abundance iridium hexafluoride or iridium tetrafluoride by reducing the enriched process gasses to produce a highly amorphous form of elemental enriched iridium-191, often referred to as iridium-black. The iridium produced by such processes lacks crystallinity, has a very small average particle size (typically sub-nanometer), has a very high internal surface area and is porous.

It has been found that such amorphous (or substantially amorphous) iridium powder can be cold-compressed to form compacts having 30-50% of the theoretical density of iridium. These can be partially densified, bonded and fused by sintering at an unexpectedly low temperature, well below the temperature that is common for crystalline materials. The high surface energy due to high internal surface area and high amorphous lattice energy may drive densification, crystallization, grain growth and interparticle fusion at lower than expected temperatures.

It has been found that partial densification of substantially amorphous pure iridium powder, such as the material produced by gas a centrifuge enrichment process, can be achieved at temperatures as low as 1300° C. Moreover, the addition of certain sintering additives that are non-activating, low-activating or compatibly-activating (i.e. producing minimal interfering gamma ray emissions), and having lower melting point than iridium can form alloys, intermetallic compounds or combinations thereof with iridium. Such additives include, but are not limited to aluminum, vanadium, boron-11, silicon, phosphorous, sulfur, carbon, beryllium, titanium, nickel, tungsten or alloys and intermetallic compounds thereof, which further lower the sintering temperature and may enhance the partial densification process and/or improve ductility to achieve superior bonding with improved mechanical properties at a lower temperature and time.

Finely divided amorphous or substantially amorphous Iridium powder having natural isotopic composition can also be similarly partially densified and bonded.

Partially densified, bonded, porous, low-density, iridium components can be made in the form of disks, cylinders, wires, granules or microspheres. These can be stacked or otherwise assembled together and then compressed, compacted or mechanically deformed to produce a spherical or quasi-spherical focal geometry, which is both optimum for radiography source manufacturing and for radiographic image quality.

The focal dimension of the spherical or quasi-spherical low density Iridium-192 would typically be no larger than the diagonal of a conventional stacked-disk 100% dense cylindrical source geometry.

The resulting sources would emit lower energy gamma rays leading to improved image contrast and resolution.

BRIEF DESCRIPTION OF THE DRAWINGS

Further objects and advantages of the disclosure will become apparent from the following description and from the accompanying drawings, wherein:

FIG. 2 illustrates calculated gamma energy spectral abundances as a function of iridium density in accordance with an embodiment of the present disclosure.

FIG. 4A is a side plan view of disk design options of the present disclosure.

FIG. 4B is a side plan view of a prior art disk design.

FIG. 9 is a plan view of an embodiment of a disk of the present disclosure.

FIG. 10 is a cross-sectional view along plane 10-10 of FIG. 9.

DETAILED DESCRIPTION OF THE PREFERRED EMBODIMENTS

Figure 1:
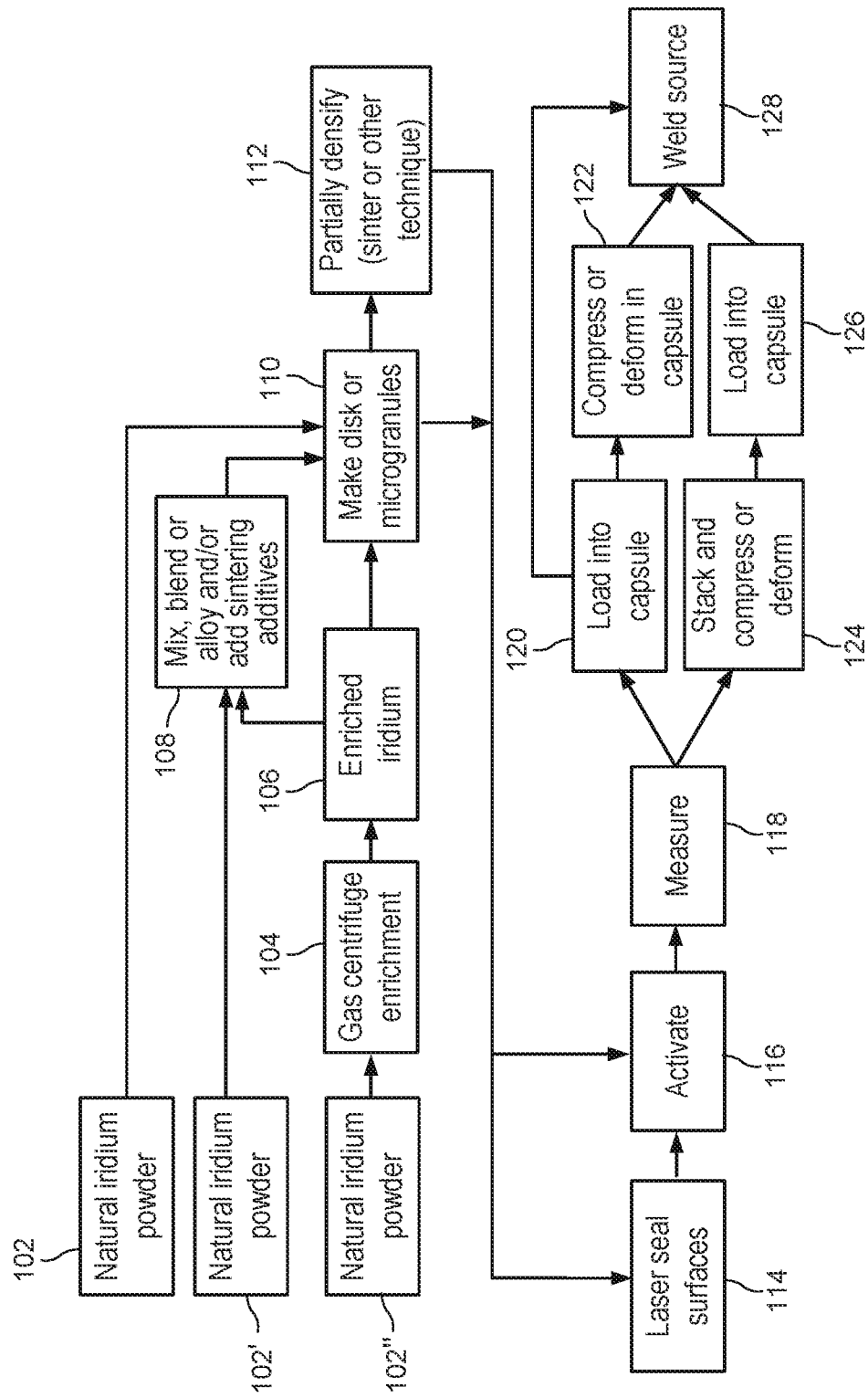
FIG. 1 is a flowchart of a typical embodiment of the manufacturing process of the present disclosure, with variations being envisioned.

Referring now to the drawings in detail, one sees that FIG. 1 is a global schematic of a typical process 100 underlying the present disclosure. Natural iridium is provided at block 102, 102' or 102". Natural iridium at block 102 is provided directly to the block of making disks or microgranules 110. Natural iridium at block 102' is alloyed or provided with sintering additives at block 108 and then provided to the block of making disks or microgranules 110. Natural iridium at block 102" is provided to the gas centrifuge enrichment block 104, the enriched iridium block 106, and optionally, alloyed or provided with sintering additives at block 108, before being provided to the block of making disks or microgranules 110. The microgranules or microbeads typically have a diameter of 0.25-0.60 mm., preferably 0.40 mm. in many embodiments. Alternately, microcylinders with a diameter of 0.20-0.50 mm., preferably 0.30 mm. in many embodiments, may be employed. These microcylinders may be formed by cutting an iridium wire of the desired diameter, before or after activation.

Iridium, in a disk or microgranule form, from block 110, regardless of the origin (102, 102' or 102") is optionally provided to block 112 for partial densification, such as by sintering or some other technique. The iridium is subsequently optionally supplied to the laser seal surface block 114, and then the activate and measure blocks 116, 118, respectively. As shown in the upper branch of the diagram, the iridium from the measure block 118 may be loaded into a capsule at block 120, optionally compressed, compacted or deformed in the capsule at block 122 and then the source is welded at block 128. Alternately, as shown in the lower branch of the diagram, the iridium from measure block 118 may be first stacked and compressed, compacted or deformed at block 124 prior to being loaded into a capsule at block 126 (similar to block 120) and then the source is welded at block 128.

Referring to FIG. 2, one sees a typical gamma energy spectrum showing calculated spectral abundances as a function of iridium density for lower density iridium in accordance with the type of processes summarized in FIG. 1.

Figure 3:
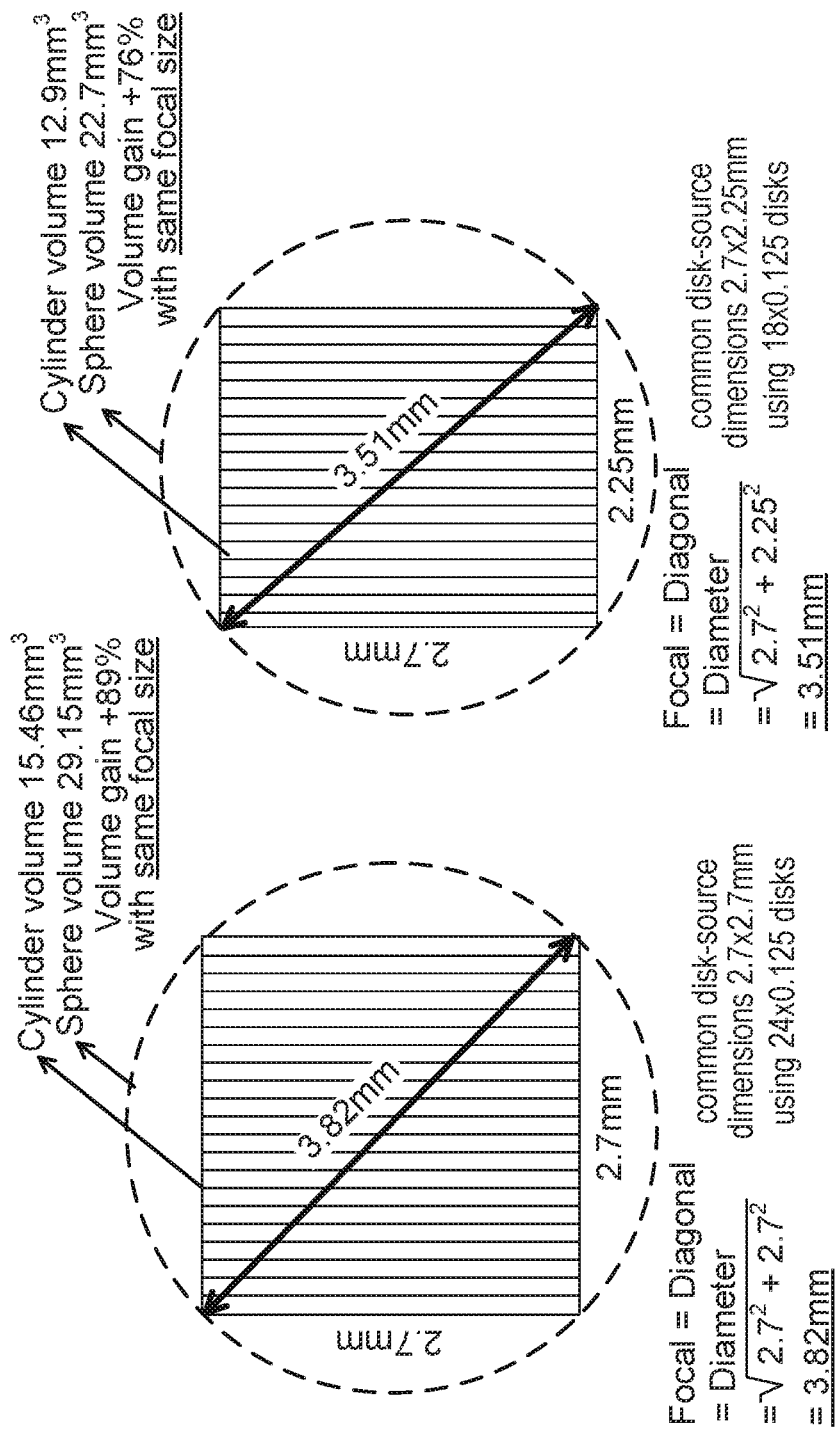
FIG. 3 illustrates the volume ratios of cylindrical stacks vs. spheres having the same focal dimension and the typical increase in emissivity and irradiation yield achieved with an embodiment of the present disclosure.

Similarly, referring to FIG. 3, one sees a typical increase in emissivity and radiation yield compared with prior art 100 percent dense iridium and proportionally higher emission at lower energies. It is noted for example, that a fifty-three percent dense sphere of a given diameter "d" (such as, but not limited to, 3.82 millimeters) has eighty-nine percent more volume than a 100 percent dense right cylinder, with a 3.82 mm. diagonal "d". Such a right cylinder has a height and diameter both equal to 2.7 mm. (3.82 mm. divided by the square-root of 2.0). These dimensions are quite typical of the active-dimensions of standard cylindrical 100 Ci Iridium-192 sources containing natural Iridium-192. However, the referenced sphere or quasi-sphere has the same focal dimension and estimated eleven to seventeen percent higher output than the referenced right cylinder (note that the relative increase in output depends on the direction the emission is measured in: axial, radial, 4π or other). It is therefore expected that spherical or quasi-spherical low density iridium-192 increases source output efficiency in the same approximate range 11-17 percent. With an expected reactor yield increase in the range of 7-11 percent, it is expected that the combined reactor yield plus output efficiency increase will be on the order of 18-28 percent.

FIG. 4A illustrates examples of compressible, compactable or deformable disk profiles which may be implemented in accordance with the type of processes summarized in FIG. 1. As opposed to the illustrated prior art design of FIG. 4B wherein a conventional flat disk profile is produced by a shallow cylindrical shape, the disk 10 of FIG. 4A is approximated by the rotation of an ellipse about its minor axis (also see FIGS. 9 and 10 for a somewhat similar shape). Alternative disk profiles are chosen from one of the various illustrated profiles 11 (a flat central cross-sectional area with sharp pointed circumferential edges), 12 (a flat central cross-sectional area with dull pointed circumferential edges), 13 (a flat narrow central cross-sectional area with dull pointed circumferential edges), 14 (a flat narrow central cross-sectional area with gently rounded circumferential edges), 15 (a discus or ellipsoid shape with somewhat rounded circumferential edges), 16 (a thinner discus or ellipsoid shape with somewhat rounded circumferential edges) and 17 (a discus or ellipsoid shape with somewhat rounded circumferential edges and a center portion 18 which is translated upwardly in the orientation of FIG. 4A to provide a stack alignment characteristic, so that a plurality of stacked disks 17 can sequentially nest with each other). These disks are typically 0.1 to 0.7 mm. thick, and typically do not exceed 0.75 mm. in thickness.

Figure 5B:
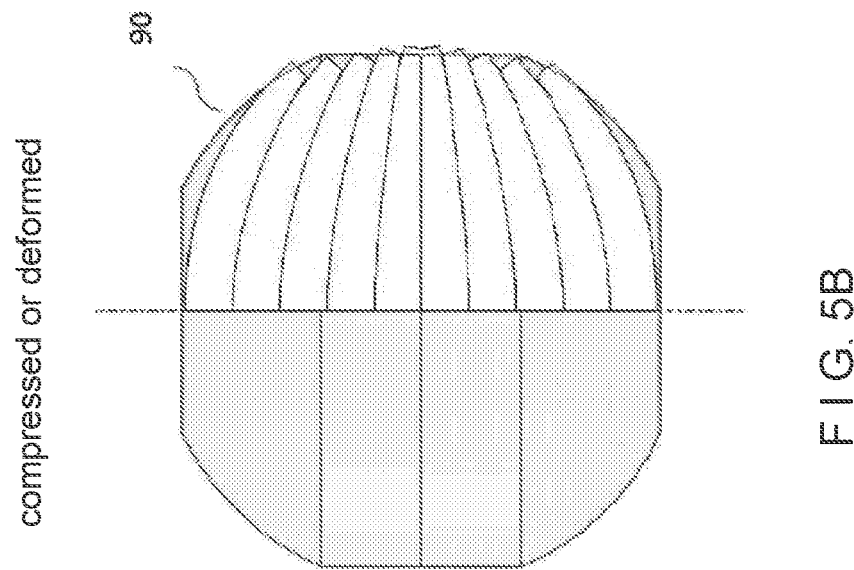
FIG. 5B is a side plan view of a preferred embodiment of a disk stack after compression, compaction or deformation thereby producing a sphere or quasi-sphere.
Figure 5A:
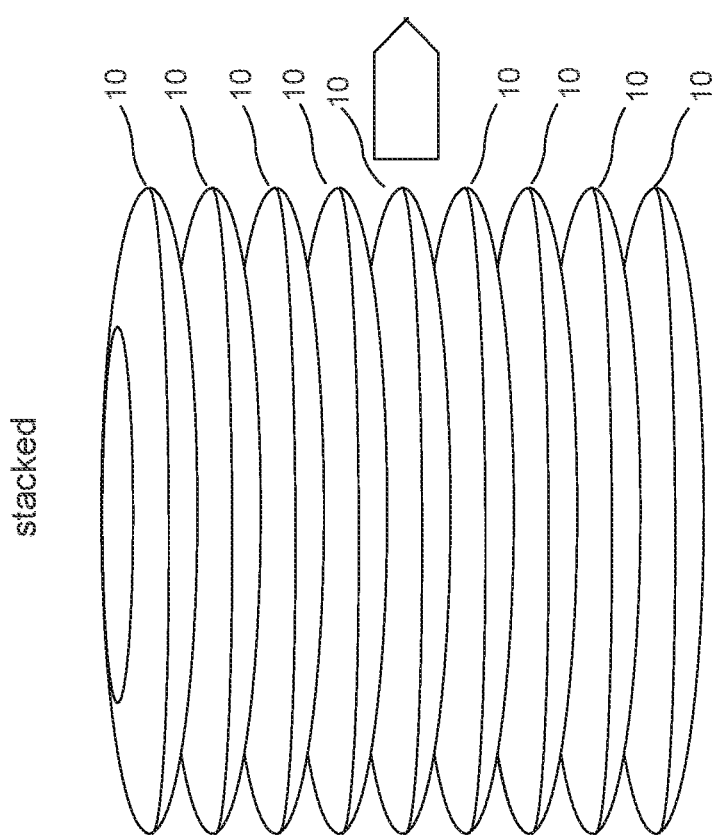
FIG. 5A is a side plan view of a preferred embodiment of a disk stack prior to compression, compaction or deformation to produce a sphere or quasi-sphere.

FIG. 5A illustrates a stack of the disks 10 (or alternately, any of 11 through 17) prepared for compression, compaction or deformation (see blocks 122 and 124 of FIG. 1) to form the spherical or quasi-spherical irradiation source 90 of FIG. 5B.

Figure 6:
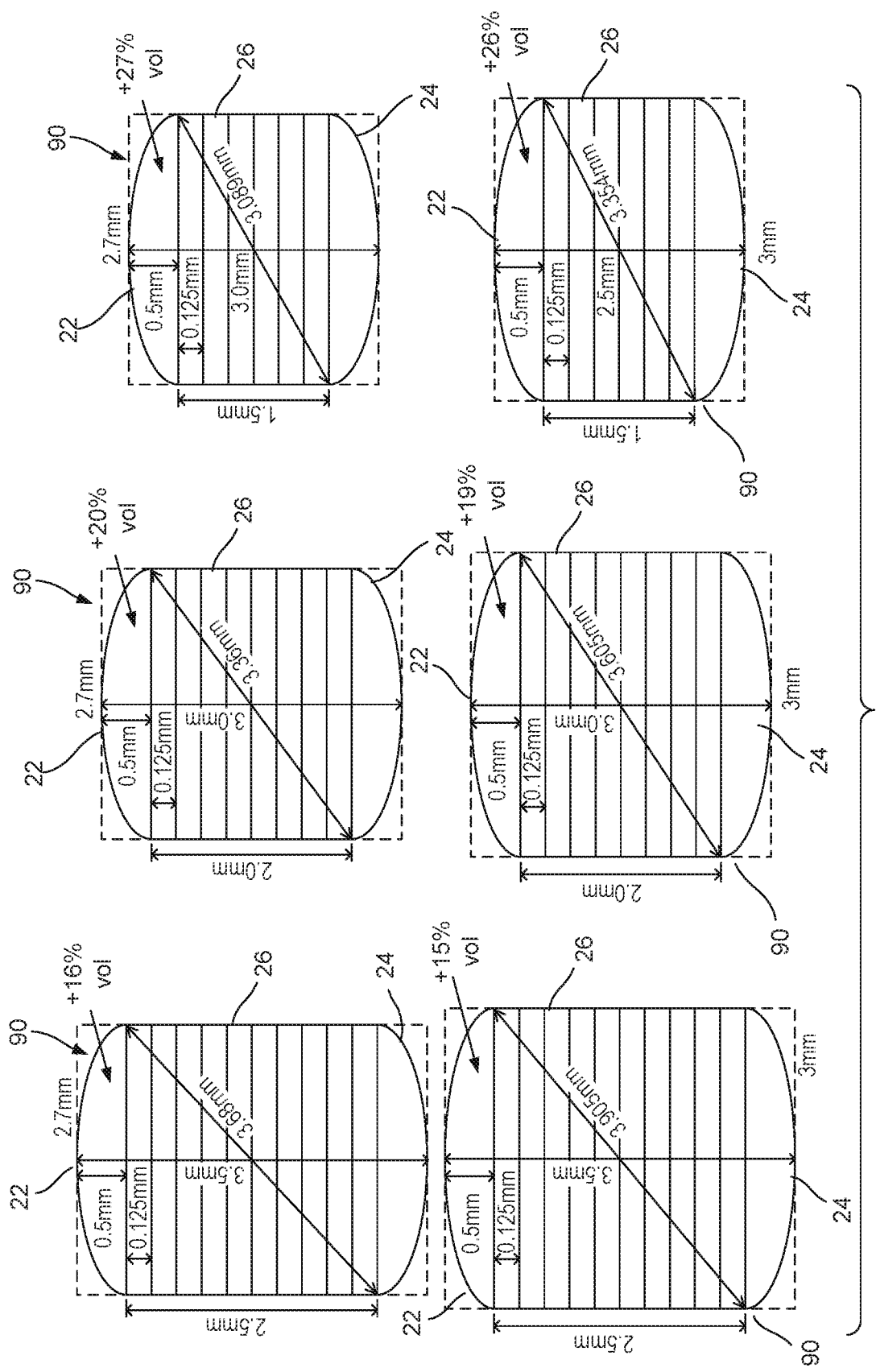
FIG. 6 illustrates disk stacking without compression, compaction or deformation to spherical/quasi-spherical geometry using hemi-discus-shaped end pieces.

An alternative embodiment of an irradiation source 90 as shown in FIG. 6 contains Iridium-191 in the form of a metal, alloy, compound, composite or porous variant of the above optimum iridium density range of the active insert (chosen from 30-85 percent, 40-70 percent or 50-65 percent) in which hemi-discus-shaped, hemi-ellipsoid or chamfered end-pieces 22, 24 are placed at each end of a stack of flat disks 26. The disks 26 may optimally be approximately 0.25 mm. thick or up to a maximum of about 0.5 mm. thick to maximize activation efficiency and minimize neutron self-shielding during activation. The curved end pieces 22, 24 may optimally be approximately be 0.5 mm. thick in the center or up to a maximum of about 0.75 mm. thick in the center to maximize activation efficiency and minimize neutron self-shielding during activation. This forms a cylinder with curved (or chamfered) ends (similar to a domed vosoid or shiltoid shape).

Figure 8:
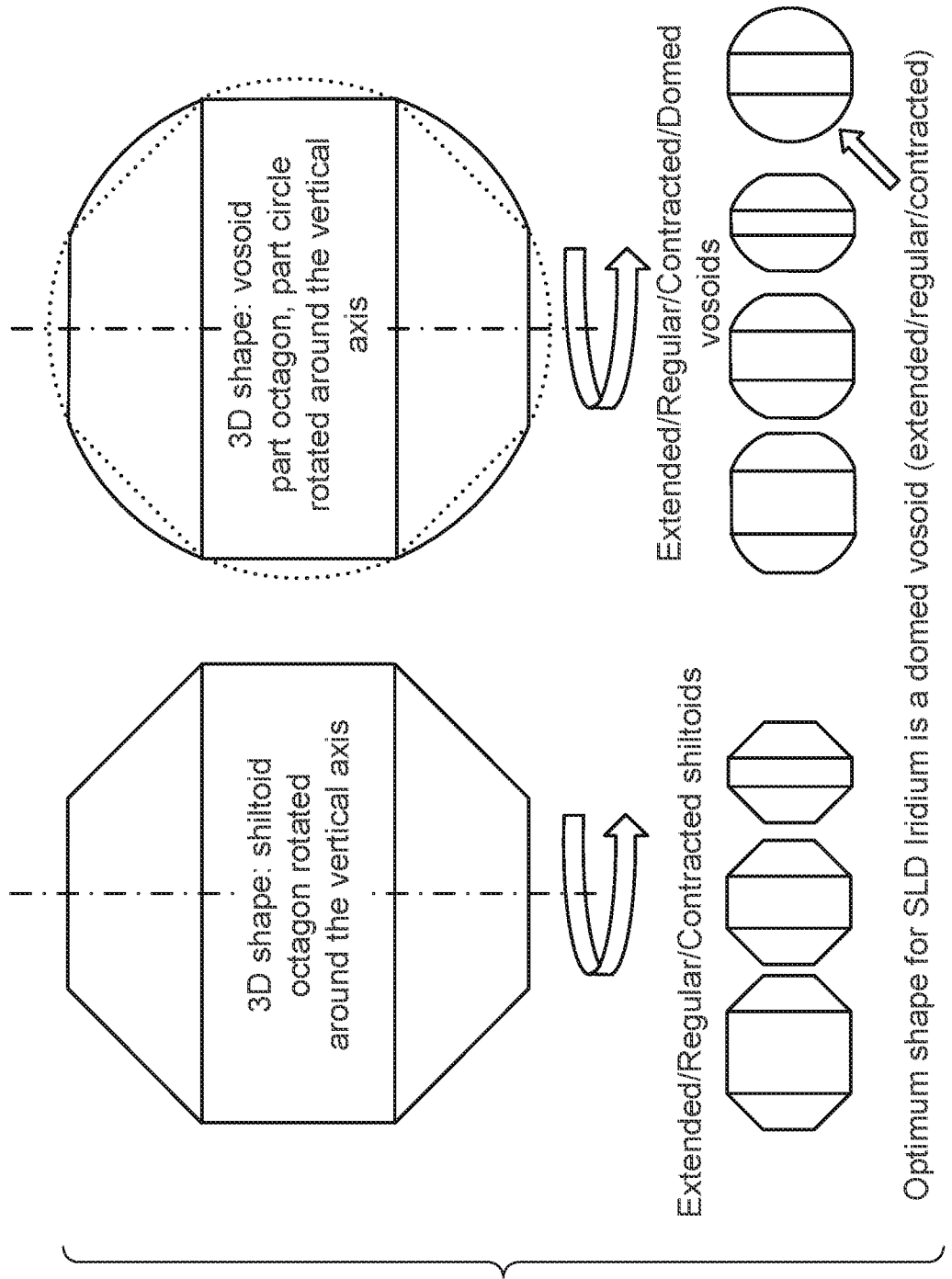
FIG. 8 illustrates the shiltoid and vosoid shapes, as defined by the applicants.

A shiltoid, as coined by the applicants and as illustrated in FIG. 8, is formed by rotating an octagon about its vertical axis. Likewise, a vosoid, as coined by the applicants and as illustrated in FIG. 8, is formed by inscribing an octagon within a circle, retaining the alternating octagonal walls which form the top, bottom and vertical sides while retaining the circular portions for the remaining portions, and then rotating the resulting shape about its vertical axis. Although the geometry in FIG. 6 is less spherical in shape than the preferred shapes, this may have other advantages. It could enable conventional disk irradiations to be carried out using conventional irradiation target geometry.

A further alternative includes the use of porous iridium, possibly including a non-activating, low-activating or compatibly-activating sintering additive or binder such as, but not limited to aluminum, vanadium, boron-11, silicon, phosphorous, sulfur, carbon, beryllium, titanium, nickel, tungsten or any of their alloys such as DOP26 alloy and intermetallic compounds thereof. Additionally, some platinum-192 and osmium-192 may be created in situ as a β-decay product of iridium-192. Depending upon the specific elemental proportions or physical states of the composite, compound or alloy, varying degrees of ductility and bonding may be achieved. Lower ductility configurations may be brittle resulting in fracture in response to stress. Higher ductility configurations may allow for the composite, compound or alloy to be compressed, compacted or deformed into the desired shape, such as, but not limited to a sphere or quasi-sphere.

Additionally, under some circumstances, milling with sufficient physical impact may allow the iridium and such additives as aluminum or vanadium to bond or alloy-bond (that is, an alloy is formed at the immediate areas of intersection between the iridium particles and the additive particles). Cold pressing iridium with an aluminum or vanadium additive may produce a resulting product with an iridium density less than 100 percent (due to the presence of the additive and/or porosity).

Figure 7:
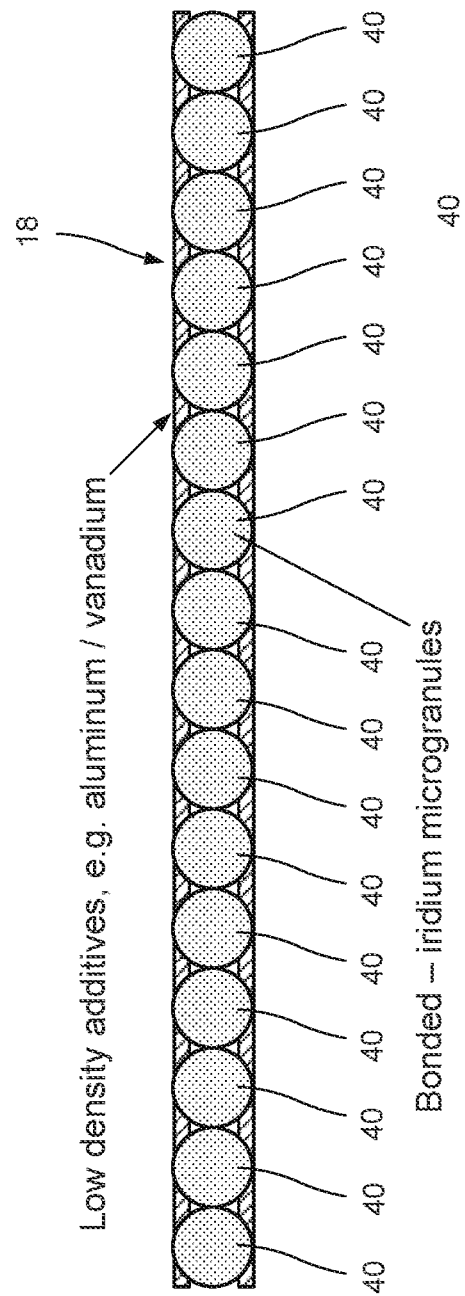
FIG. 7 illustrates a cross-sectional view of a disk comprising bonded microspheres and bonding additives.

Moreover, liquid sintering may be performed using a liquid additive, such as, but not limited to, aluminum heated above its melting point, which may be melted in situ or poured into a volume of iridium microspheres with a resulting product with an iridium density less than 100 percent (due to the presence of the additive). The liquid additive hardens at a reduced temperature and maintains the iridium microspheres in place. In some embodiments, the microspheres or microgranules may be provided in a single layer bonded with aluminum or vanadium or other compatible low-density bonding metal to form a disk 18 of low-density bonded microspheres or microgranules 40 (see FIG. 7), which can be activated using conventional disk irradiation targets, stacked after activation and then compressed, compacted or otherwise deformed to form a spherical or quasi-spherical source insert.

Further embodiments include pressing of iridium in a nanoparticle form (sometimes referred to as "iridium black") which results in an amorphous (non-crystalline) product and an iridium density in the range 30-50%, but more typically about 35 percent, as compared to conventional solid iridium. Similarly, iridium and aluminum, both in nanoparticle form, may be mixed and heated to effect bonding between the particles, and then pressed into a disk.

A domed (discus-shaped) disk for the iridium alloys, compounds or other composites, including porous iridium, can facilitate easier compression, compaction or deformation to quasi-spheres within the active insert as in FIGS. 4A, 5A and 5B.

In instances when partially sintered or pressed porous low density iridium was excessively friable to be handled without risking breakage or erosion of the surfaces, the disks could be sealed together using soft foil metals (such as, but not limited to, aluminum, titanium or vanadium alloys or other typically non-activating or low-activating alloys). Other options may include laser-melting, sintering or bonding of the surfaces of the disks, similar to the process of laser engraving a solid circle, which may seal and strengthen the surface of the disk. These domed (discus-shaped) disks may be subsequently compressed, compacted or deformed into spherical or quasi-spherical shapes for use in an active insert as shown in FIGS. 5A and 5B.

Further embodiments of reduced density iridium may be achieved by three-dimensional printing techniques using a reservoir or powder bed of iridium, iridium alloy, composite particles and/or a binder. Such a process may further include subsequent incineration of the binder.

Thus the several aforementioned objects and advantages are most effectively attained. Although preferred embodiments of the invention have been disclosed and described in detail herein, it should be understood that this invention is in no sense limited thereby.

What is claimed is:

1. A radiation source including iridium, wherein at least a portion of the iridium is porous or microporous iridium, and wherein the density of the active insert containing the iridium is in a range of 30 to 85 percent of the density of 100% dense pure iridium, wherein the iridium is Iridium-192 contained within a metal, alloy, compound, or composite in the form of disks having flat, curved or shaped faces that are thicker in the middle than at the circumference, which are stacked, compressed or otherwise formed into a sphere or quasi-sphere.

2. The radiation source of claim 1 wherein the iridium is in a range of 40 to 70 percent of the density of 100% dense pure iridium.

3. The radiation source of claim 1 wherein the iridium is in a range of 50 to 65 percent of the density of 100% dense pure iridium.

4. The radiation source of claim 1, wherein the pores within the porous or microporous iridium contain a low-density metal, alloy, compound or composite of a non-activating, low activating or compatibly activating additive.

5. The radiation source of claim 1 wherein the iridium is in the form of a metal, alloy, compound or composite, prior to neutron irradiation.

6. The radiation source of claim 1 wherein the iridium disks are between 0.1-0.7 mm thick.

7. A radiation source including iridium, wherein at least a portion of the iridium is porous or microporous iridium, and wherein the density of the active insert containing the iridium is in a range of 30 to 85 percent of the density of 100% dense pure iridium, wherein the iridium metal, alloy, compound, or composite is in the form of approximately 0.4 mm. diameter microbeads or microgranules approximately 0.3 mm diameter microcylinders containing porous Iridium-191, prior to neutron irradiation.

8. A radiation source including iridium, wherein at least a portion of the iridium is porous or microporous iridium, and wherein the density of the active insert containing the iridium is in a range of 30 to 85 percent of the density of 100% dense pure iridium, wherein the iridium metal, alloy, compound, or composite is in the form of microbeads or microgranules with a diameter of 0.25-0.60 mm. or microcylinders with a diameter of 0.20-0.50 mm, containing porous Iridium-191, prior to neutron irradiation.

9. A radiation source including iridium, wherein at least a portion of the iridium is porous or microporous iridium, and wherein the density of the active insert containing the iridium is in a range of 30 to 85 percent of the density of 100% dense pure iridium, wherein the iridium metal, alloy, compound, or composite is in the form of approximately 0.3 mm diameter wire containing porous Iridium-191, prior to neutron irradiation, which is then cut after activation to form microcylinders.

10. The radiation source of claim 8 wherein the microbeads, microgranules or microcylinders of Iridium-191 metal, alloy, compound, or composite are in a random-packed or partly random configuration.

11. The radiation source of claim 1 wherein the disks are less than 0.75 mm. thick, prior to neutron irradiation.

12. The radiation source of claim 1 further including a spherical or quasi-spherical source cavity in which the iridium is contained.

13. The radiation source of claim 1, wherein the pores within the porous or microporous iridium contain a low-density metal, alloy, compound or composite of a non-activating, low activating or compatibly activating additive, which aids sintering, compaction or deformation, wherein the additive or additives are selected from the group consisting of aluminum, vanadium, boron-11, silicon, phosphorous, sulfur, carbon, beryllium, titanium, nickel, tungsten or alloys and intermetallic compounds thereof.

* * * * *